(12) United States Patent
Zhu et al.

(10) Patent No.: US 11,706,758 B2
(45) Date of Patent: Jul. 18, 2023

(54) NARROW BAND RADIO FREQUENCY CHAIN COMPONENT CARRIER SCHEDULING TECHNIQUES

(71) Applicant: QUALCOMM Incorporated, San Diego, CA (US)

(72) Inventors: Jun Zhu, San Diego, CA (US); Yongle Wu, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 17/167,598

(22) Filed: Feb. 4, 2021

(65) Prior Publication Data

US 2022/0248429 A1 Aug. 4, 2022

(51) Int. Cl.
H04W 72/1268 (2023.01)
H04W 72/02 (2009.01)

(52) U.S. Cl.
CPC ....... *H04W 72/1268* (2013.01); *H04W 72/02* (2013.01)

(58) Field of Classification Search
CPC ...... H04W 24/08; H04W 48/16; H04W 88/06
See application file for complete search history.

(56) References Cited

U.S. PATENT DOCUMENTS

2018/0084448 A1    3/2018  Yang et al.
2021/0377960 A1*  12/2021  Carl ................. H04W 24/08

FOREIGN PATENT DOCUMENTS

| EP | 2957122 A1 * | 12/2015 | ............ H04W 24/04 |
| EP | 2957122 A1 | 12/2015 | |
| WO | WO-2010121708 A1 * | 10/2010 | .......... H04L 5/0007 |
| WO | 2019033328 A1 | 2/2019 | |
| WO | WO-2019029369 A1 * | 2/2019 | ............ H04W 24/02 |

OTHER PUBLICATIONS

International Search Report and Written Opinion—PCT/US2021/064923—ISA/EPO—dated Apr. 8, 2022.

* cited by examiner

*Primary Examiner* — Ayanah S George
(74) *Attorney, Agent, or Firm* — Patterson & Sheridan, L.L.P.

(57) ABSTRACT

Certain aspects of the present disclosure provide techniques for scheduling component carriers and one or more operations on a per NB RF chain basis. A method that may be performed by a user equipment (UE) includes monitoring occurrences of a first number of operations to be performed for a plurality of component carriers (CCs) according to different periodicities, determining a second number of available narrow band (NB) radio frequency (RF) chains, and scheduling, on the available NB RF chains, up to the second number of the operations to be performed for the plurality of CCs based on a scheduling algorithm if the first number is greater than the second number.

30 Claims, 7 Drawing Sheets

NARROW BAND RADIO FREQUENCY CHAIN COMPONENT CARRIER SCHEDULING TECHNIQUES

INTRODUCTION

Field of the Disclosure

Aspects of the present disclosure relate to wireless communications, and more particularly, to techniques for scheduling component carriers on a narrow band (NB) radio frequency (RF) chain basis for fifth generation (5G) new radio (NR).

BACKGROUND

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, such challenges may include challenges in scheduling component carriers at user equipments (UEs) with limited narrow band (NB) radio frequency (RF) chains. Consequently, there exists a need for further improvements in wireless communications systems to overcome various challenges.

SUMMARY

Certain aspects can be implemented in a method for wireless communication by a user equipment (UE). The method generally includes monitoring occurrences of a first number of operations to be performed for a plurality of component carriers (CCs) according to different periodicities, determining a second number of available narrow band (NB) radio frequency (RF) chains, and scheduling, on the available NB RF chains, up to the second number of the operations to be performed for the plurality of CCs based on a scheduling algorithm if the first number is greater than the second number.

Certain aspects can be implemented in an apparatus for wireless communication by a user equipment (UE). The apparatus may include a processing system, comprising: a memory comprising computer-executable instructions and one or more processors configured to execute the computer-executable instructions and cause the processing system to: monitor occurrences of a first number of operations to be performed for a plurality of component carriers (CCs) according to different periodicities, determine a second number of available narrow band (NB) radio frequency (RF) chains, and schedule, on the available NB RF chains, up to the second number of the operations to be performed for the plurality of CCs based on a scheduling algorithm if the first number is greater than the second number.

Certain aspects can be implemented in an apparatus for wireless communication by a user equipment (UE). The apparatus may include means for monitoring occurrences of a first number of operations to be performed for a plurality of component carriers (CCs) according to different periodicities, means for determining a second number of available narrow band (NB) radio frequency (RF) chains, and means for scheduling, on the available NB RF chains, up to the second number of the operations to be performed for the plurality of CCs based on a scheduling algorithm if the first number is greater than the second number.

Certain aspects can be implemented in a non-transitory computer-readable medium for wireless communication by a user equipment (UE). The non-transitory computer-readable medium may comprise computer-executable instructions that, when executed by one or more processors of a processing system, cause the processing system to: monitor occurrences of a first number of operations to be performed for a plurality of component carriers (CCs) according to different periodicities, determine a second number of available narrow band (NB) radio frequency (RF) chains, and schedule, on the available NB RF chains, up to the second number of the operations to be performed for the plurality of CCs based on a scheduling algorithm if the first number is greater than the second number.

Certain aspects can be implemented in a computer program product for wireless communication by a user equipment (UE) embodied on a computer-readable storage medium. The computer-readable storage medium may comprise code for monitoring occurrences of a first number of operations to be performed for a plurality of component carriers (CCs) according to different periodicities, determining a second number of available narrow band (NB) radio frequency (RF) chains, and scheduling, on the available NB RF chains, up to the second number of the operations to be performed for the plurality of CCs based on a scheduling algorithm if the first number is greater than the second number.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/ purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The following description and the appended figures set forth certain features for purposes of illustration.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
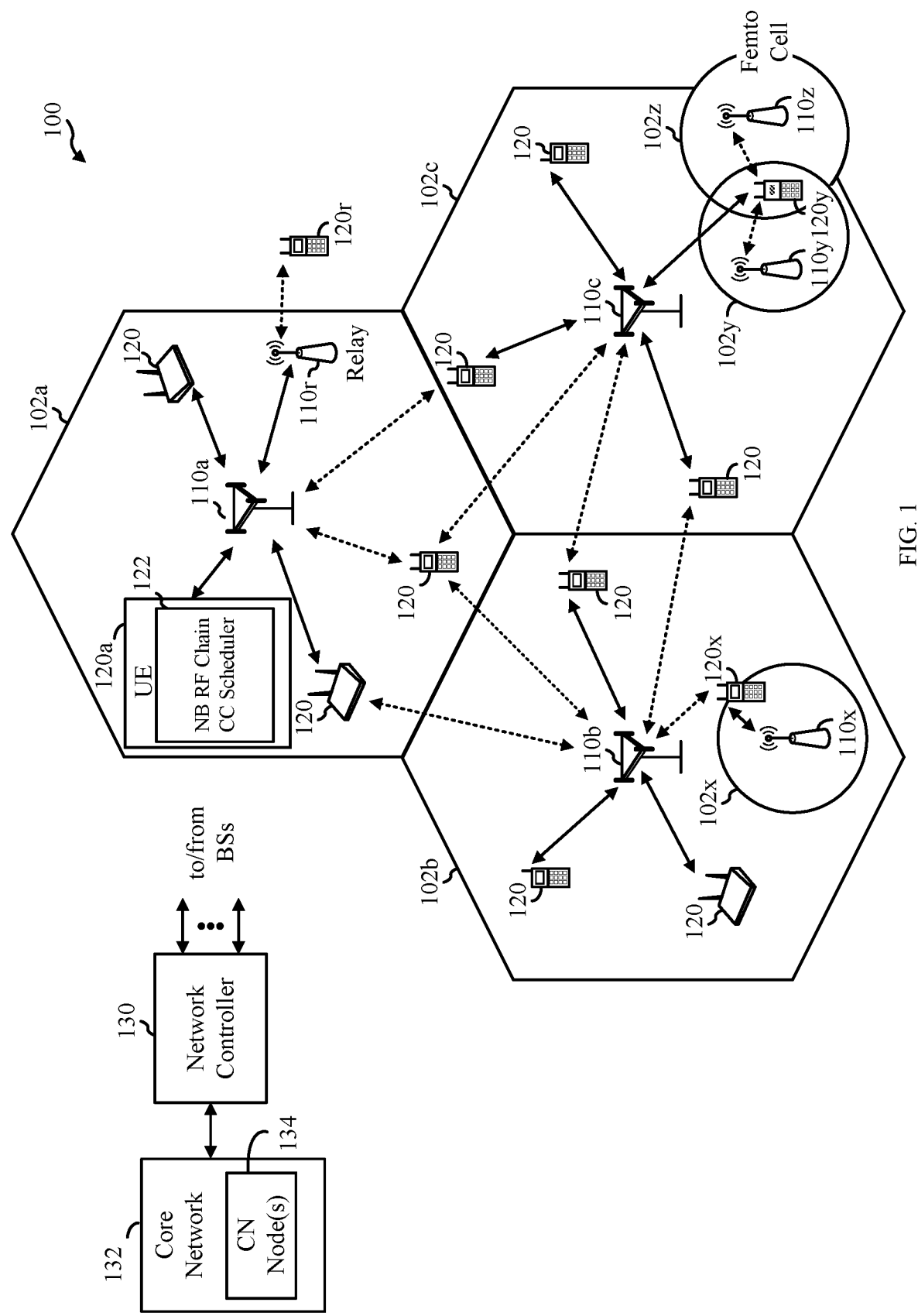
FIG. 1 is a block diagram conceptually illustrating an example telecommunications system, in accordance with certain aspects of the present disclosure.

Aspects of the present disclosure provide apparatus, methods, processing systems, and computer readable mediums for scheduling component carriers and one or more operations on a per narrow band (NB) radio frequency (RF) chain basis. For example, in some cases, when communicating using component carriers, a user equipment (UE) may need to periodically perform one or more operations associated with these component carriers to meet certain operating requirements. Such operations may include, for example, cell search operations, cell measurement operations, radio link monitoring operations, time tracking loop operations, frequency tracking look operations, and/or automatic gain control operations. In some cases, UE may include up to four NB RF chains, which may be capable of accommodating operations for two component carriers simultaneously. However, if the communicates using more than two component carriers the four NB RF chains main not be able to handle the operations for the more than two component carriers simultaneously. In such cases, aspects of the present disclosure provide techniques for scheduling the operations for component carriers on a per NB RF basis. Such techniques may allow the UE to intelligently schedule different operations for different CCs using a limited number of NB RF chains while still being able satisfy the operating requirements for these different CCs.

The following description provides examples of scheduling component carriers and one or more operations on a per NB RF chain basis in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, UEs 120 may be configured for scheduling component carriers and one or more operations on a per narrow band (NB) radio frequency (RF) chain basis. As shown in FIG. 1, the UE 120a includes a NB RF chain CC scheduler 122. The NB RF chain CC scheduler 122 may be configured to perform the operations illustrated in one or more of FIG. 5, as well as other operations disclosed herein for scheduling component carriers and one or more operations on a per NB RF chain basis, in accordance with aspects of the present disclosure.

Figure 2:
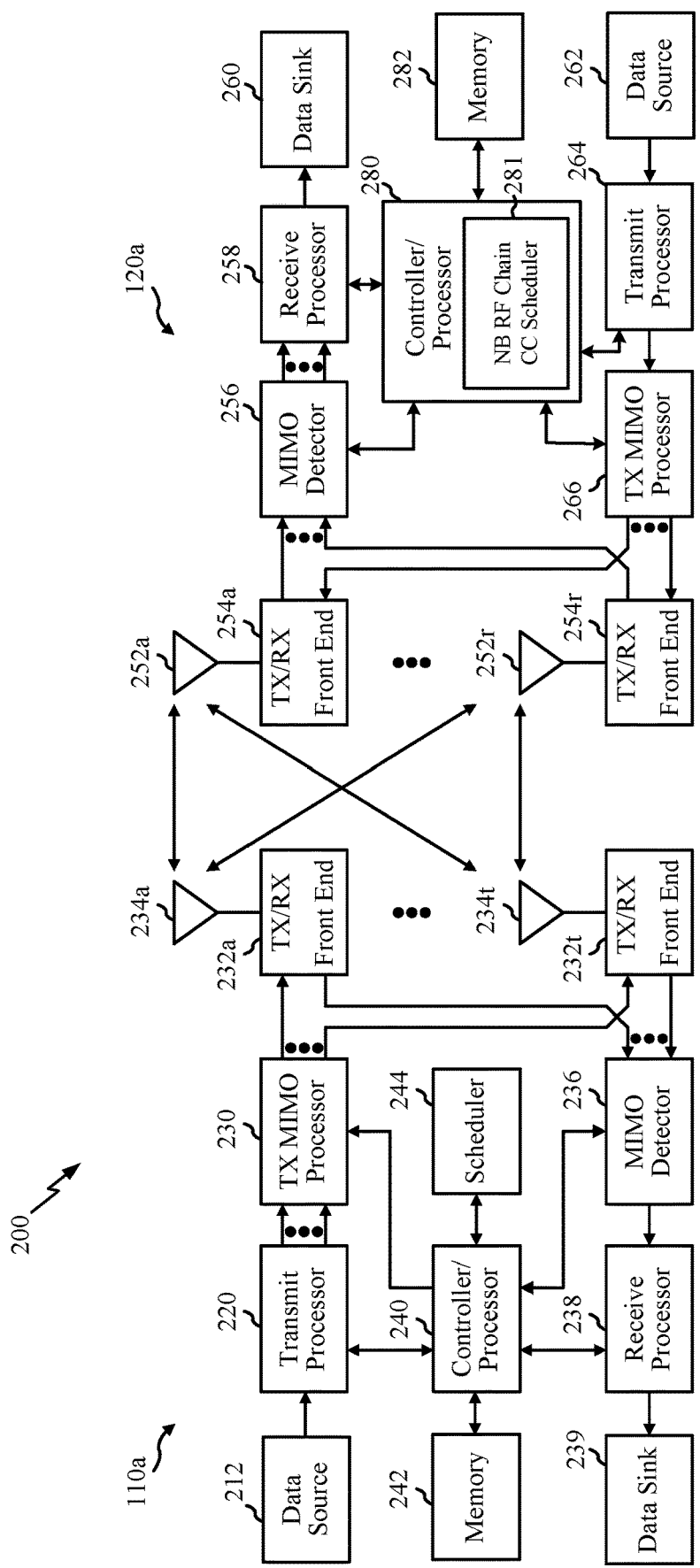
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the transmit (TX) front-end circuits 232a through 232t. Each TX front-end circuit 232 may process a respective output symbol stream (e.g., for OFDM, etc.) to obtain an output sample stream. Each TX front-end circuit may further process (e.g., convert to analog, amplify, filter, and upconvert) the output sample stream to obtain a downlink signal. Downlink signals from TX front-end circuits 232a through 232t may be transmitted via the antennas 234a through 234t, respectively.

At the UE 120a, the antennas 252a-252r may receive the downlink signals from the BS 110a and may provide received signals to the receive (RX) front-end circuits 254a through 254r, respectively. Each RX front-end circuit 254 may condition (e.g., filter, amplify, downconvert, and digitize) a respective received signal to obtain input samples. Each RX front-end circuit may further process the input samples (e.g., for OFDM, etc.) to obtain received symbols. A MIMO detector 256 may obtain received symbols from all the RX front-end circuits 254a through 254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the RX front-end circuits 254a through 254r (e.g., for SC-FDM, etc.), and transmitted to the BS 110a. At the BS 110a, the uplink signals from the UE 120a may be received by the antennas 234, processed by the TX front-end circuits 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The controllers/processors 240 and 280 may direct the operation at the BS 110 and the UE 120, respectively. The processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink. In certain aspects, the TX/RX front-end circuits 232, 254 may include a tuning circuit for adjusting a source impedance seen by a portion of a receive path, as further described herein.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 280 of the UE 120a includes an NB RF chain CC scheduler 281 that may be configured to perform the operations illustrated in FIG. 5, as well as other operations described herein for scheduling component carriers and one or more operations on a per NB RF chain basis, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 kHz, and other SCS may be defined with respect to the base SCS (e.g., 30 kHz, 60 kHz, 120 kHz, 240 kHz, etc.).

Figure 3:
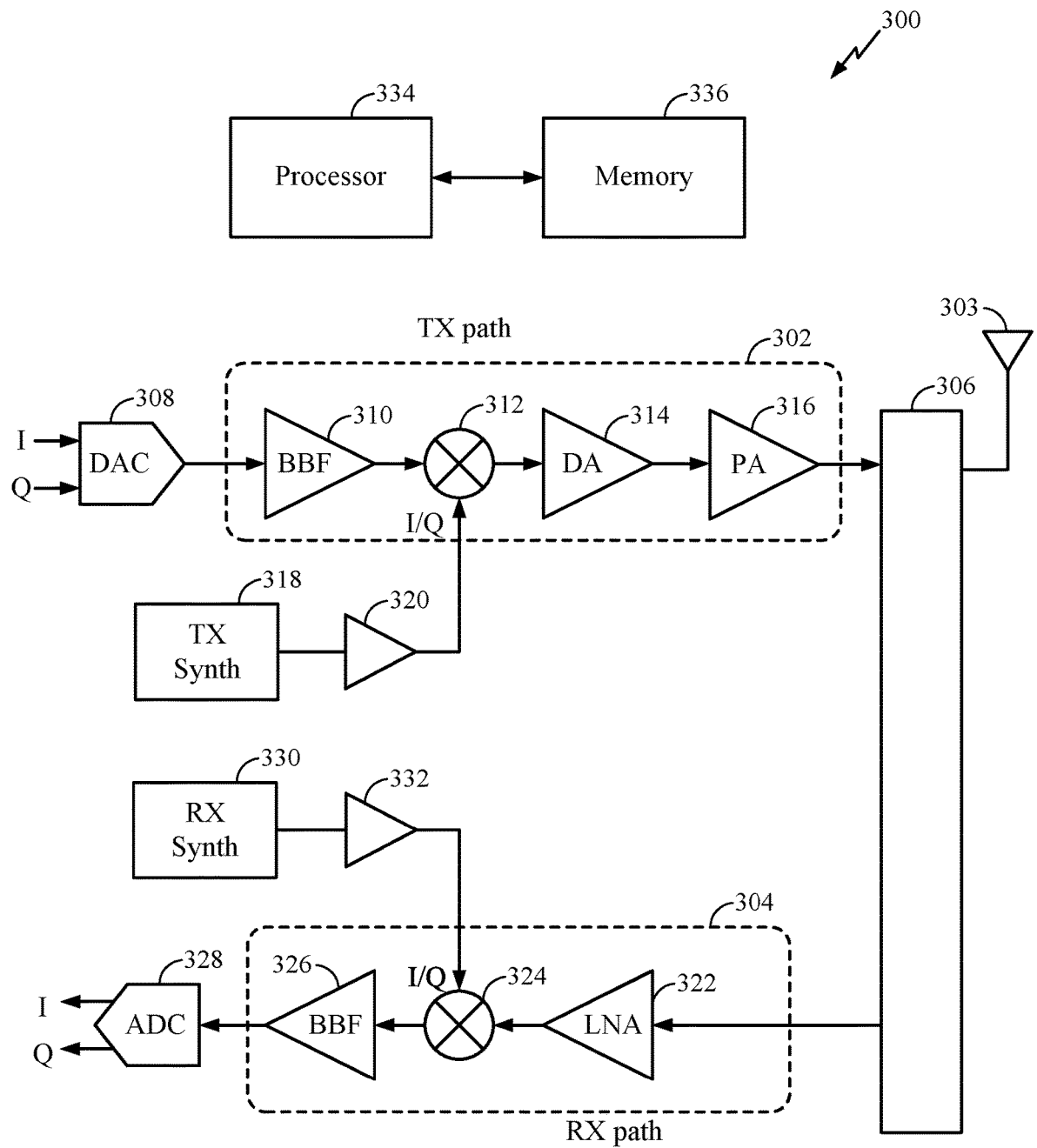
FIG. 3 is a block diagram showing an example transceiver front-end, in accordance with certain aspects of the present disclosure.

FIG. 3 is a block diagram of an example transceiver front-end 300, such as TX/RX front-end circuits 232, 254 in FIG. 2, in accordance with certain aspects of the present disclosure. The transceiver front-end 300 includes at least one transmit (Tx) path 302 (also known as a transmit chain or radio frequency (RF) chain) for transmitting signals via one or more antennas and at least one receive (Rx) path 304 (also known as a receive chain or RF chain) for receiving signals via the antennas. When the TX path 302 and the RX path 304 share an antenna 303, the paths may be connected with the antenna via an RF interface 306, which may include any of various suitable RF devices, such as a duplexer, a switch, a diplexer, and the like. While FIG. 3 illustrates one Tx chain (e.g., TX path 302 or RF chain) and one Rx chain (e.g., RX path 304 or RF chain), it should be understood that the transceiver front-end 300 may include more than one Tx chain and one Rx chain. That is, the transceiver front-end 300 may include multiple RF chains. In some cases, one or more of the TX path 302 or the RX path 304 may be scheduled to perform operations (e.g., a cell search operations, cell measurement operations, frequency tracking loop operations, time tracking loop operations, radio link monitoring operations, automatic gain control operations) for a plurality of component carriers, as described below.

Receiving in-phase (I) or quadrature (Q) baseband analog signals from a digital-to-analog converter (DAC) 308, the TX path 302 may include a baseband filter (BBF) 310, a mixer 312, a driver amplifier (DA) 314, and a power amplifier (PA) 316. The BBF 310, the mixer 312, and the DA 314 may be included in a radio frequency integrated circuit (RFIC), while the PA 316 may be included in the RFIC or external to the RFIC. The BBF 310 filters the baseband signals received from the DAC 308, and the mixer 312 mixes the filtered baseband signals with a transmit local oscillator (LO) signal to convert the baseband signal of interest to a different frequency (e.g., upconvert from baseband to RF). This frequency conversion process produces the sum and difference frequencies between the LO frequency and the frequencies of the baseband signal of interest. The sum and difference frequencies are referred to as the beat frequencies. The beat frequencies are typically in the RF range, such that the signals output by the mixer 312 are typically RF signals, which may be amplified by the DA 314 and/or by the PA 316 before transmission by the antenna 303.

The RX path 304 may include a low noise amplifier (LNA) 322, a mixer 324, and a baseband filter (BBF) 326. The LNA 322, the mixer 324, and the BBF 326 may be included in a radio frequency integrated circuit (RFIC), which may or may not be the same RFIC that includes the TX path components. RF signals received via the antenna 303 may be amplified by the LNA 322, and the mixer 324 mixes the amplified RF signals with a receive local oscillator (LO) signal to convert the RF signal of interest to a different baseband frequency (i.e., downconvert). The baseband signals output by the mixer 324 may be filtered by the BBF 326 before being converted by an analog-to-digital converter (ADC) 328 to digital I or Q signals for digital signal processing.

While it is desirable for the output of an LO to remain stable in frequency, tuning to different frequencies may indicate using a variable-frequency oscillator, which can involve compromises between stability and tunability. Contemporary systems may employ frequency synthesizers with a voltage-controlled oscillator (VCO) to generate a stable, tunable LO with a particular tuning range. Thus, the transmit LO may be produced by a TX frequency synthesizer 318, which may be buffered or amplified by amplifier 320 before being mixed with the baseband signals in the mixer 312. Similarly, the receive LO may be produced by an RX frequency synthesizer 330, which may be buffered or amplified by amplifier 332 before being mixed with the RF signals in the mixer 324.

Figure 4:
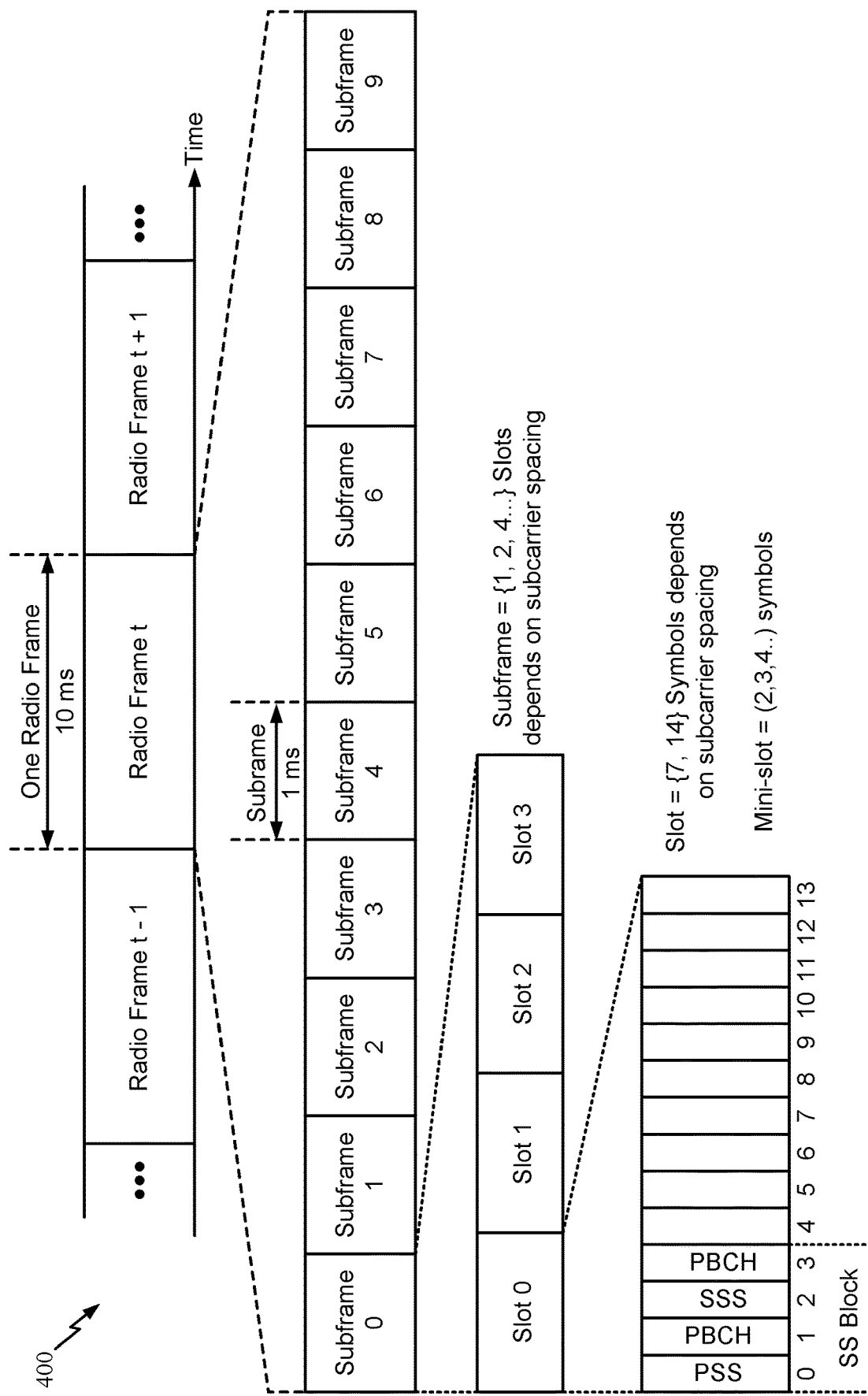
FIG. 4 is an example frame format for new radio (NR), in accordance with certain aspects of the present disclosure.

FIG. 4 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block (SSB) is transmitted. The SS block includes a PSS, a SSS, and a two symbol PBCH. The SS block can be transmitted in a fixed slot location, such as the symbols 0-3 as shown in FIG. 4. The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within radio frame, SS burst set periodicity, system frame number, etc.

Further system information such as, remaining minimum system information (RMSI), system information blocks (SIBs), other system information (OSI) can be transmitted on a physical downlink shared channel (PDSCH) in certain subframes.

Aspects Related to Scheduling CCs Per NB RF Chain

As noted above, the user equipment (UE) 120a may include a transceiver front-end 300 that includes at least one transmit (TX) path 302 (also known as a transmit chain or radio frequency (RF) chain) for transmitting signals via one or more component carriers (CCs) on one or more antennas and at least one receive (RX) path 304 (also known as a receive chain or RF chain) for receiving signals via the one or more CCs on the one or more antennas. In some cases, the TX path 302 and RX path 304 may operate in, or according to, one or more narrow bands and, thus, may be known as narrow band (NB) RF chains. For example, in some cases, TX path 302 and/or RX path 304 may be used for operations such as cell search or cell measurement. RF chains that are used for cell search and cell measurement may be known as NB chains because cell search and cell measurement are narrow band operations as compared to, for example, wide band (WB) physical downlink shared channel (PDSCH) operations that may span an entire operating bandwidth of the UE. In some cases, the one or more narrow bands in which the NB RF chains (e.g., TX path 302 and RX path 304) may operate may include one or more bands in a FR1 frequency range (e.g., 410 MHz-7.125 GHz).

In some cases, the UE may schedule different CCs (e.g., a primary CC (PCC), an activated secondary CC (SCC), a deactivated SCC) to meet certain operating requirements associated with operations to be performed on the different CCs. For example, in some case, the operations comprise one or more of: cell searching, cell measurement, or radio link monitoring. Additionally, in some cases, the operations may relate to loop requirement for a modem of the UE on a per-CC basis, such as a time tracking loop (TTL), a frequency tracking loop (FTL), or automatic gain control (AGC). In some cases, the operating requirements may be defined for the different CCs in terms of scheduling periodicities required for performing the one or more operations. Table 1, below, provides an illustration of the different operating requirements for the one or more operations to be performed for the different CCs.

TABLE 1

Operating Requirements for Different CC Operations

| Component Carrier Normal/Panic Mode | Cell Search | Cell Measurement | Loop/RLM |
|---|---|---|---|
| PCC | 320 ms/80 ms | 80 ms | 20 ms |
| PCC starving | 600 ms/160 ms | 200 ms | 80 ms |
| SCC | 320 ms * # of SCC | 80 ms * # of SCC | 20 ms |
| SCC starving | 600 ms * # of SCC | 200 ms * # of SCC | 80 ms |

As shown, depending on the operating mode the scheduling periodicity for the cell search operation may change. For example, the cell search scheduling periodicity requirement for a PCC in normal mode is 320 ms while when the UE is operating in a panic mode, the scheduling periodicity requirement for the PCC is 80 ms. As shown, the scheduling periodicity requirements for the remaining CC operations (e.g., cell measurement, loop, and RLM) may be the same regardless of whether the UE is in panic mode or not. Further, as can be seen, the scheduling periodicity requirements for the cell search and cell measurement operations for the SCC may be defined based on the number of SCCs configured at the UE. For example, the cell search operation for the SCC may be defined as 320 ms multiplied by the number of SCCs. Additionally, the different operating requirements shown in Table 1 may include a PCC starving case and SCC starving case, which represent a minimum scheduling periodicity for performing the one or more operations. In other words, the periodicities for PCC starving and SCC starving refers to the edge of a wireless standards requirement for the corresponding operations. That is, if a starving timer associated with the corresponding operations expires, the standards requirement for these operations will be violated. For example, the cell search scheduling periodicity for PCC starving for the normal mode is 600 ms while the cell search scheduling periodicity for PCC starving for the panic mode is 160 ms.

In some cases, the UE 120a may include up to four NB RF chains and each NB RF chain may be able to process two receive (Rx) operations/beams on one CC. In certain legacy devices/UEs, up to two CCs are supported for FR1. In such cases, the four NB RF chain may be sufficient to serve four Rx operations on the two CCs (e.g., four Rx beams per CC). In other words, the four NB RF chains may be able to simultaneously accommodate the performance of the one or more operations discussed above for the two CCs.

However, in newer (e.g., non-legacy) devices, such devices may support more than two CCs for FR1 while still including only up to four NB RF chains. In such cases, the four NB RF chains of these devices may not be able to simultaneously serve the more than two CCs (generally, devices with 2× NB RF chains may not be able to serve 4 Rx operations on greater than X CCs). In other words, the four NB RF chains may not be able to simultaneously accommodate the performance of the one or more operations discussed above for the more than two CCs. For example, as noted above, each NB RF chain may schedule two Rx on one CC. On the UE side, cell search, cell measurement, RLM, and loop operations should be performed on four Rx in total. However, when communicating on more than two CCs, the cell search, cell measurement, RLM, and loop operations would require more than four NB RF chains. As can be seen, this presents an issue with satisfying the operating requirements for the one or more operations, since this UE needs to schedule different CCs (e.g., PCC, activated SCC, de-activated SCC, etc.) for performance of the one or more operations with a limited number of NB RF chains (e.g., due to hardware/firmware constraints) that may not be able to simultaneously accommodate the different CCs and their corresponding one or more operations. Additionally, such scheduling issues may be may be exacerbated that the different CCs may be configured (e.g., via radio resource control (RRC) signaling) or activated (e.g., via media access control control element (MAC-CE) signaling) at different occasions, leading to operations of the different CCs becoming misaligned (e.g., a cell search of the PCC may collide with cell measurement on the SCC).

Thus, aspects of the present disclosure provide techniques for reducing the issues described above related to satisfying operating requirements for different CCs in FR1, for example, when the UE includes a limited number of NB RF chains and the different CCs include more than two CCs. For example, such techniques may include configuring the UE with an NB RF chain CC scheduler (e.g., NB RF chain CC scheduler 122, 281) that allows the UE to decide, for each NB RF chain of the UE, which operation (e.g., cell search, cell measurement, loop, RLM) to perform on which CC. In other words, these techniques may allow the UE to intelligently schedule different operations for different CCs (e.g., based on a scheduling algorithm) using the limited number of NB RF chains while still being able satisfy the operating requirements for these different CCs discussed above.

Figure 5:
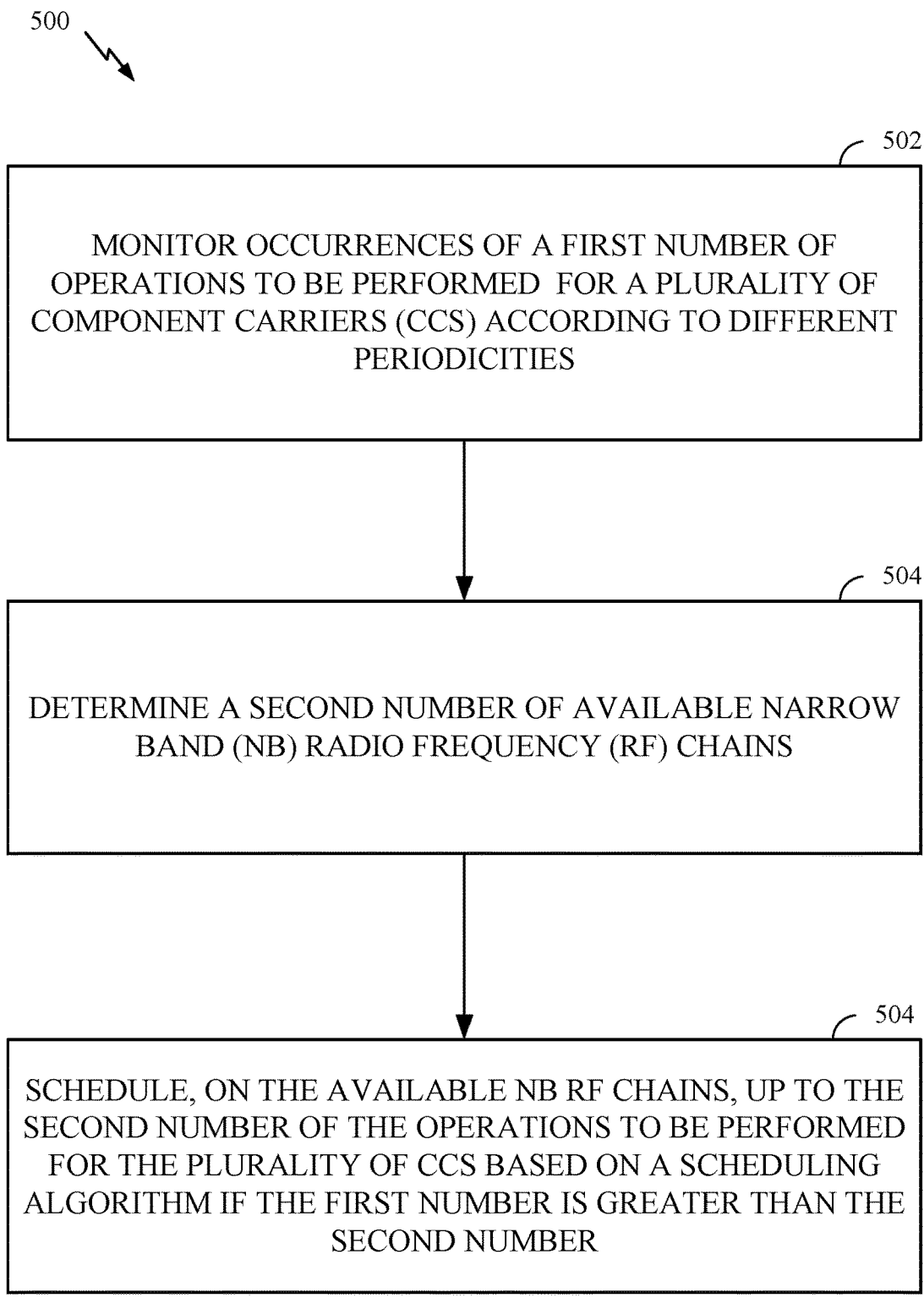
FIG. 5 is a flow diagram illustrating example operations for wireless communication by a UE in a wireless network, in accordance with certain aspects of the present disclosure.

FIG. 5 is a flow diagram illustrating example operations 500 for wireless communication, in accordance with certain aspects of the present disclosure. The operations 500 may be performed, for example, by UE (e.g., such as a UE 120a in the wireless communication network 100) for scheduling component carriers and one or more operations on a per NB RF chain basis. Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, in block 502, by monitoring occurrences of a first number of operations to be performed for a plurality of component carriers (CCs) according to different periodicities.

In block 504, the UE determines a second number of available narrow band (NB) radio frequency (RF) chains of the UE.

In block 506, the UE schedules, on the available NB RF chains, up to the second number of the operations to be performed for the plurality of CCs based on a scheduling algorithm if the first number is greater than the second number.

Additional Details Regarding Scheduling CCs Per NB RF Chain

As noted above, the UE may monitor occurrences of a first number of operations to be performed for a plurality of CCs according to different periodicities. In some cases, the operations may include one or more of cell searching, cell measurement, operations related to a time tracking loop (TTL), operations related to a frequency tracking loop (FTL), operations related to radio link monitoring (RLM), or operations related to automatic gain control (AGC).

In some cases, monitoring occurrences of the first number of operations to be performed for the plurality of CCs may include maintaining timers for at least some of the first number of operations and CCs of the plurality of CCs. For example, in some cases, the UE may maintain a timer for each CC-operation combination that records the remaining time until a next scheduled synchronization signal burst set (SSBS)/SSB-based radio resource management (RRM) measurement timing configuration (SMTC) window for that CC-operation combination.

According to aspects, the CC-operation combination may refer to the pairs of CCs and operations illustrated in Table 1, above. For example, in some cases, the UE may maintain a first timer for a cell search operation for the PCC, a second timer for a cell measurement operation for the PCC, a third timer for a loop or RLP operation for the PCC, and so on. In some cases, a value of a timer may be set to the indicated scheduling periodicity in Table 1 for a respective CC-operation combination/pair. For example, the first timer for the cell search operation for the PCC may be set 320 ms for the normal mode or 80 ms for the panic mode. Likewise, the second timer for the cell measurement operation for the PCC may be set to 80 ms, and so on.

According to aspects, upon expiration of one or more of the maintained timers, the UE (or the NB RF chain CC scheduler 122, 281 in the UE) may determine a number of available NB RF chains that may be used to schedule one or more of the operations for the plurality of CCs. In some cases, the UE may determine the number of available NB RF chains before expiration of the one or more maintained timers. Thereafter, the UE may select the top K CC-operation combinations/pairs (e.g., from Table 1) with expired times to schedule on a particular available NB RF chain, where K is the number of available NB RF chains. If the first number of operations to be scheduled for the plurality of CCs is greater that the number of available NB RF chains (e.g., implying that the UE does not have a sufficient number of NB RF chains to accommodate the number of operations simultaneously), the UE may schedule, on the available NB RF chains, up to K operations to be performed for the plurality of CCs based on a scheduling algorithm. Thereafter, the UE may perform the K operations for the plurality of CCs on the available NB RF chains. For example, in some cases, the UE may perform a cell search or cell measurement for a CC the available NB RF chain. In other cases, the UE may perform TTL operations, FTL operations, AGC operations, or RLM operations for a particular CC on the available NB RF chains.

In some cases, scheduling based on the scheduling algorithm may include independently deciding, for each available NB RF chain, which operation to perform on which CC of the plurality of CCs. For example, in some cases, the scheduling algorithm may specify to the UE to perform a first operation (e.g., cell search) for a first CC (e.g., PCC) on a first available NB RF chain and to perform a second operation (e.g., cell search) for a second CC (e.g., SCC) on a second available NB RF chain.

In some cases, when multiple CC-operation combination timers are expired (i.e., when the number of CC-operation combinations with expired timers is above the threshold), the UE may prioritize which CC-operation combination is performed on a particular available NB RF chain. For example, in some cases, when multiple CC-operation combination timers are expired (e.g., above a threshold), the scheduling algorithm used by the UE (e.g., the NB RF chain CC scheduler 122, 281) may take into account priority levels associated with the CC-operation combinations. In some cases, CC-operation combinations with higher priorities may be scheduled before CC-operation combination with lower priority levels. For example, in some cases, operations to be performed on PCC may have a higher priority level than operations to be performed on an SCC. Additionally, operations to be performed on an activated SCC may have a higher priority level than operations to be performed on a de-activated SCC. Additionally, in some cases, operations related to cell searching may have a higher priority level than operations related to at least one of a time or frequency tracking loop. Additionally, in some cases, operations related to at least one of a time or frequency tracking loop have a higher priority level than operations related to cell measurement.

Table 2, below, provides an illustration of different priority levels for different CC-operation combinations (e.g., of Table 1).

TABLE 2

Priority Values for CC-Operation Combinations

| CC-Operation Combination | Priority Level |
|---|---|
| PCC starving cell search | 0 |
| PCC starving loop/RLM | 1 |
| PCC starving cell measurement | 2 |
| SCC starving cell search | 3 |
| SCC starving loop/RLM | 4 |
| SCC starving cell measurement | 5 |
| PCC cell search | 6 |
| PCC loop/RLM | 7 |
| PCC cell measurement | 8 |
| SCC cell search | 9 |
| SCC loop/RLM | 10 |
| SCC cell measurement | 11 |

Accordingly, in some cases, the UE may determine priorities levels (e.g., based on Table 2) associated with the multiple CC-operation combinations with expired timers. Thereafter, the scheduling algorithm may configure the UE to schedule CC-operation combinations on the particular available NB RF chain that have higher priority levels before operations with lower priority levels. For example, as shown in Table 2, since a PCC cell search operation has a higher priority level (e.g., 6) than a SCC cell measurement operation (e.g., 11), the scheduling algorithm may configure the UE to schedule the PCC cell search on the particular available NB RF chain before the SCC cell measurement operation.

Figure 6:
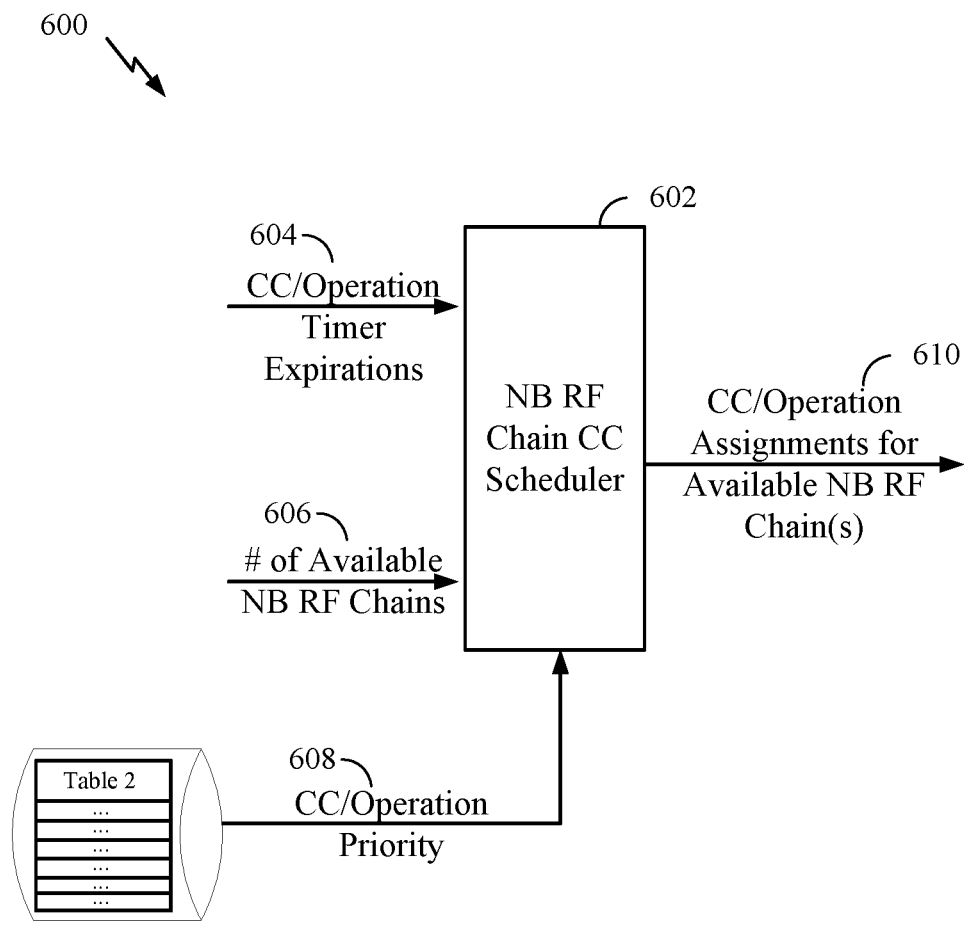
FIG. 6 illustrates an input/output diagram for a narrow band (NB) radio frequency (RF) chain component carrier (CC) scheduler, in accordance with certain aspects of the present disclosure.

FIG. 6 provides a high-level input/output diagram 600 of a NB RF chain CC scheduler 602 configured to determine scheduling assignments of one or more operations for a plurality of CCs on one or more NB RF chains, in accordance with certain aspects presented herein. In some cases, the NB RF chain CC scheduler 602 may include the NB RF chain CC schedule 122 of FIG. 1 or the NB RF chain CC scheduler 281 of FIG. 2, and may be configured to perform the operations 500 illustrated in FIG. 5, as well as other operations described herein for scheduling component carriers and one or more operations on a per NB RF chain basis.

For example, as shown at 604, the NB RF chain CC scheduler 602 may receive a first input indicating a first number of operations to be performed for a plurality of CCs according to different periodicities corresponding to the operations. For example, the first input may indicate one or more CC-operation combinations with expired timers, indicating that these CC-operation combinations should be scheduled on an available NB RF chain.

The NB RF chain CC scheduler 602 may receive a second input 606 indicating a second number of available NB RF chains for which operations for the plurality of CCs (e.g., for which the CC-operation combinations) may be scheduled. In some cases, the number of available NB RF chains may be up to four NB RF chains in certain UEs.

In some cases, when there are multiple CC-operation combinations with expired timers (e.g., above a threshold) (e.g., such that the second number of available NB RF chains are not able to accommodate all CC-operation combinations simultaneously), scheduling of the CC/operation combinations on the second number of available NB RF chains may be prioritized. For example, as illustrated, the NB RF chain CC scheduler 602 may receive a third input 610 indicating priority levels for the multiple CC-operation combinations with expired timers. In some cases, the third input 610 may be based on Table 2 described above, which may be stored in memory (e.g., memory 282)

Thereafter, a scheduling algorithm in the NB RF chain CC scheduler 602 may schedule one or more operations to be performed for the plurality of CCs on the available NB RF chains. For example, as shown at 610, the NB RF chain CC scheduler 602 may output one or more CC-operation combination assignments on the section number of available NB RF chains, taking into account the first input 604 (e.g., the indication of CC/operation timer expirations), the second input 606 (e.g., the indication of the number of available NB RF chains), and the third input 608 (e.g., the indication of the CC/operation priorities).

Example Wireless Communication Devices

Figure 7:
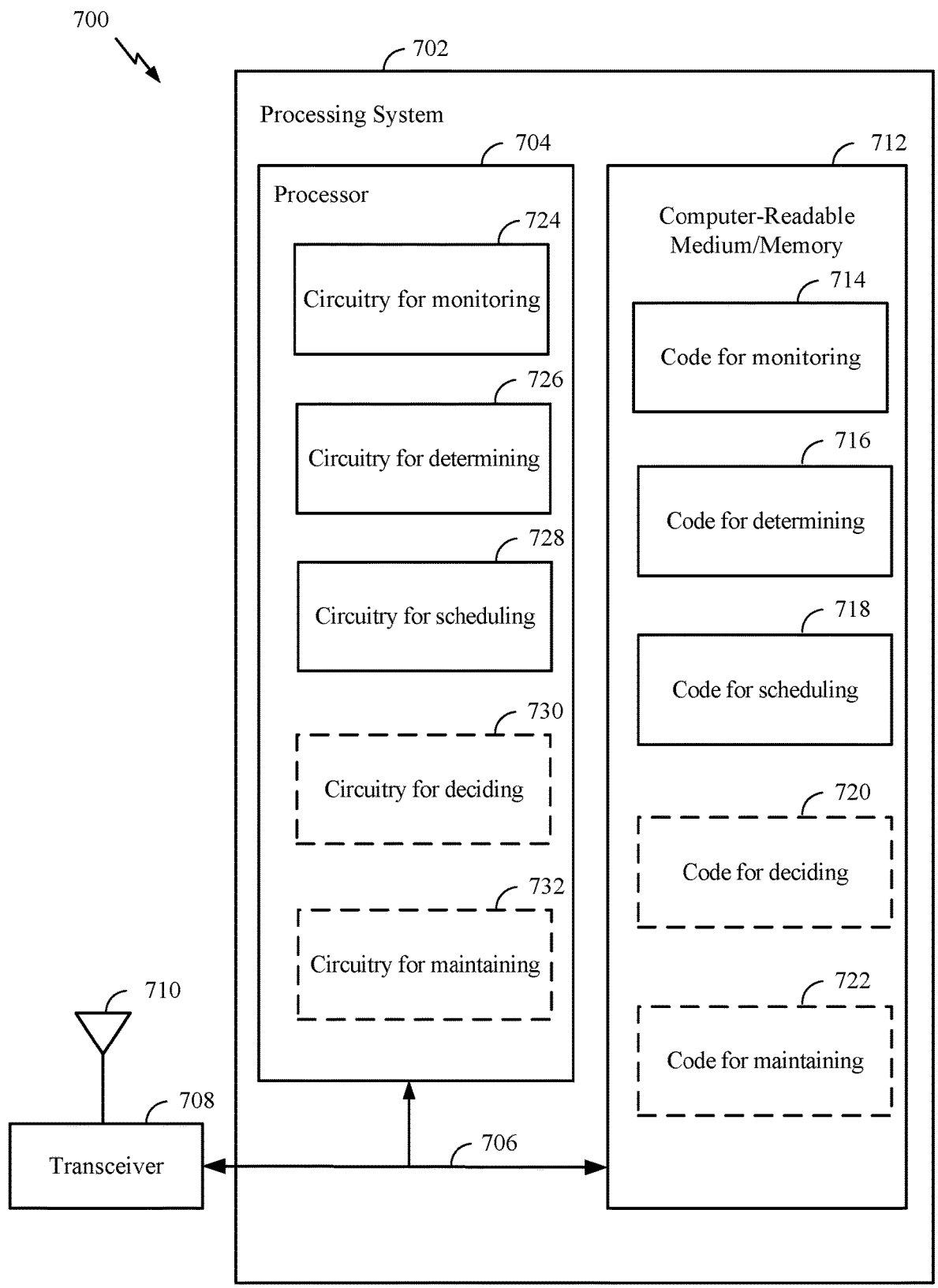
FIG. 7 illustrates a communications device that may include various components configured to perform operations for the techniques disclosed herein in accordance with aspects of the present disclosure.

FIG. 7 illustrates a communications device 700 that may include various components operable, configured, or adapted to perform operations for the techniques disclosed herein, such as the operations illustrated in FIG. 5.

Communications device 700 includes a processing system 702 coupled to a transceiver 708 (e.g., a transmitter and/or a receiver). Transceiver 708 is configured to transmit and receive signals for the communications device 700 via an antenna 710, such as the various signals as described herein. Processing system 702 may be configured to perform processing functions for communications device 700, including processing signals received and/or to be transmitted by communications device 700. The transceiver 608 can include one or more components of UE 120a with reference to FIG. 2 such as, for example, transceiver 254, TX MIMO processor 266, transmit processor 264, receive processor 258, MIMO detector 256, and/or the like.

Processing system 702 includes a processor 704 coupled to a computer-readable medium/memory 712 via a bus 706. In certain aspects, computer-readable medium/memory 712 is configured to store instructions (e.g., computer-executable code) that when executed by processor 704, cause processor 704 to perform the operations illustrated in FIG. 5, or other operations for performing the various techniques discussed herein for scheduling component carriers and one or more operations on a per NB RF chain basis. In some cases, the processor 604 can include one or more components of UE 120a with reference to FIG. 2 such as, for example, controller/processor 280 (including the UE capability information component 281), transmit processor 264, receive processor 258, and/or the like. Additionally, in some cases, the computer-readable medium/memory 612 can include one or more components of UE 120a with reference to FIG. 2 such as, for example, memory 282 and/or the like.

In certain aspects, computer-readable medium/memory 712 stores code 714 for monitoring, code 716 for determining, code 718 for scheduling, code 720 for deciding, and code 722 for maintaining.

In some cases, code 714 for monitoring includes code for monitoring occurrences of a first number of operations to be performed for a plurality of component carriers (CCs) according to different periodicities.

In some cases, code 716 for determining includes code for determining a second number of available narrow band (NB) radio frequency (RF) chains.

In some cases, code 718 for scheduling includes code for scheduling, on the available NB RF chains, up to the second number of the operations to be performed for the plurality of CCs based on a scheduling algorithm if the first number is greater than the second number.

In some cases, code 720 for deciding includes code for independently deciding, for each NB RF chain, which operation to perform on which CC.

In some cases, code 722 for maintaining includes code for maintaining timers for at least some of the first number of operations.

In some cases, code 716 for determining includes code for determining priority levels of operations for which multiple timers have expired, wherein the scheduling algorithm takes into account the priority levels.

Processor 704 has circuitry configured to implement the code stored in the computer-readable medium/memory 712. For example, processor 704 includes circuitry 724 for monitoring, circuitry 726 for determining, circuitry 728 for scheduling, circuitry 730 for deciding, and circuitry 732 for maintaining.

In some cases, circuitry 724 for monitoring includes circuitry for monitoring occurrences of a first number of operations to be performed for a plurality of component carriers (CCs) according to different periodicities.

In some cases, circuitry 726 for determining includes circuitry for determining a second number of available narrow band (NB) radio frequency (RF) chains.

In some cases, circuitry 728 for scheduling includes circuitry for scheduling, on the available NB RF chains, up to the second number of the operations to be performed for the plurality of CCs based on a scheduling algorithm if the first number is greater than the second number.

In some cases, circuitry 730 for deciding includes circuitry for independently deciding, for each NB RF chain, which operation to perform on which CC.

In some cases, circuitry 732 for maintaining includes circuitry for maintaining timers for at least some of the first number of operations.

In some cases, circuitry 726 for determining includes circuitry for determining priority levels of operations for which multiple timers have expired, wherein the scheduling algorithm takes into account the priority levels.

In some cases, the operations illustrated in FIG. 5, as well as other operations described herein for scheduling component carriers and one or more operations on a per NB RF chain basis, may be implemented by one or means-plus-function components. For example, in some cases, such operations may be implemented by means for monitoring, means for determining, means for scheduling, means for deciding, and means for maintaining.

In some cases, means for monitoring, means for determining, means for scheduling, means for deciding, and means for maintaining, includes a processing system, which may include one or more processors, such as the receive processor 258, the transmit processor 264, the TX MIMO processor 266, and/or the controller/processor 280 of the UE 120a illustrated in FIG. 2 and/or the processing system 702 of the communication device 700 in FIG. 7.

Example Clauses

Implementation examples are described in the following numbered clauses:

Clause 1: A method for wireless communications by a user-equipment (UE), comprising: monitoring occurrences of a first number of operations to be performed for a plurality of component carriers (CCs) according to different periodicities, determining a second number of available narrow band (NB) radio frequency (RF) chains, and scheduling, on the available NB RF chains, up to the second number of the operations to be performed for the plurality of CCs based on a scheduling algorithm if the first number is greater than the second number.

Clause 2: The method of Clause 1, wherein the operations comprise one or more of: cell searching, cell measurement, operations related to a time tracking loop, operations related to a frequency tracking loop, or radio link monitoring (RLM).

Clause 3: The method of any of Clauses 1-2, wherein the scheduling comprises independently deciding, for each NB RF chain, which operation to perform on which CC.

Clause 4: The method of any of Clauses 1-3, wherein monitoring the occurrences of the first number of operations comprises maintaining timers for at least some of the first number of operations.

Clause 5: The method of Clause 4, further comprising determining priority levels of operations for which multiple timers have expired, wherein the scheduling algorithm takes into account the priority levels.

Clause 6: The method of Clause 5, wherein the scheduling algorithm schedules operations with higher priority levels before operations with lower priority levels.

Clause 7: The method of Clause 6, wherein operations to be performed on a primary component carrier (PCC) have a higher priority level than operations to be performed on a secondary component carrier (SCC).

Clause 8: The method of any of Clauses 6-7, wherein operations to be performed on an activated secondary component carrier (SCC) have a higher priority level than operations to be performed on a de-activated SCC.

Clause 9: The method of any of Clauses 6-8, wherein operations related to cell searching have a higher priority level than operations related to at least one of a time or frequency tracking loop.

Clause 10: The method of any of Clauses 6-9, wherein operations related to at least one of a time or frequency tracking loop have a higher priority level than operations related to cell measurement.

Clause 11: A processing system, comprising: a memory comprising computer-executable instructions; one or more processors configured to execute the computer-executable instructions and cause the processing system to perform a method in accordance with any one of Clauses 1-10.

Clause 12: A processing system, comprising means for performing a method in accordance with any one of Clauses 1-10.

Clause 13: A non-transitory computer-readable medium comprising computer-executable instructions that, when executed by one or more processors of a processing system, cause the processing system to perform a method in accordance with any one of Clauses 1-10.

Clause 14: A computer program product embodied on a computer-readable storage medium comprising code for performing a method in accordance with any one of Clauses 1-10.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 5, as well as other operations described herein for scheduling component carriers and one or more operations on a per NB RF chain basis.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user-equipment (UE), comprising:
    monitoring occurrences of a first number of operations to be performed for a plurality of component carriers (CCs) according to different periodicities;
    determining a second number of available narrow band (NB) radio frequency (RF) chains; and
    scheduling, on the available NB RF chains, up to the second number of the operations to be performed for the plurality of CCs based on a scheduling algorithm if the first number is greater than the second number.

2. The method of claim 1, wherein the operations comprise one or more of: cell searching, cell measurement, operations related to a time tracking loop, operations related to a frequency tracking loop, or radio link monitoring (RLM).

3. The method of claim 1, wherein the scheduling comprises independently deciding, for each NB RF chain of the available NB RF chains, which operation to perform on which CC.

4. The method of claim 1, wherein monitoring the occurrences of the first number of operations comprises:
    maintaining timers for at least some of the first number of operations.

5. The method of claim 4, further comprising:
    determining priority levels of operations for which multiple timers have expired, wherein the scheduling algorithm takes into account the priority levels.

6. The method of claim 5, wherein the scheduling algorithm schedules operations with higher priority levels before operations with lower priority levels.

7. The method of claim 6, wherein:
    operations to be performed on a primary component carrier (PCC) have a higher priority level than operations to be performed on a secondary component carrier (SCC).

8. The method of claim 6, wherein:
    operations to be performed on an activated secondary component carrier (SCC) have a higher priority level than operations to be performed on a de-activated SCC.

9. The method of claim 6, wherein:
    operations related to cell searching have a higher priority level than operations related to at least one of a time or frequency tracking loop.

10. The method of claim 6, wherein:
    operations related to at least one of a time or frequency tracking loop have a higher priority level than operations related to cell measurement.

11. A processing system for wireless communication by a user equipment (UE), comprising:
    a memory comprising computer-executable instructions; and
    one or more processors configured to execute the computer-executable instructions and cause the processing system to:
        monitor occurrences of a first number of operations to be performed for a plurality of component carriers (CCs) according to different periodicities;
        determine a second number of available narrow band (NB) radio frequency (RF) chains; and
        schedule, on the available NB RF chains, up to the second number of the operations to be performed for the plurality of CCs based on a scheduling algorithm if the first number is greater than the second number.

12. The processing system of claim 11, wherein the operations comprise one or more of: cell searching, cell measurement, operations related to a time tracking loop, operations related to a frequency tracking loop, or radio link monitoring (RLM).

13. The processing system of claim 11, wherein, in order to schedule up to the second number of operations, the one or more processors are configured to cause the processing system to independently decide, for each NB RF chain of the available NB RF chains, which operation to perform on which CC.

14. The processing system of claim 11, wherein, in order to monitor the occurrences of the first number of operations, the one or more processors are configured to cause the processing system to maintain timers for at least some of the first number of operations.

15. The processing system of claim 14, wherein the one or more processors are configured to cause the processing system to determine priority levels of operations for which multiple timers have expired, wherein the scheduling algorithm takes into account the priority levels.

16. The processing system of claim 15, wherein the scheduling algorithm schedules operations with higher priority levels before operations with lower priority levels.

17. The processing system of claim 16, wherein:
operations to be performed on a primary component carrier (PCC) have a higher priority level than operations to be performed on a secondary component carrier (SCC).

18. The processing system of claim 16, wherein:
operations to be performed on an activated secondary component carrier (SCC) have a higher priority level than operations to be performed on a de-activated SCC.

19. The processing system of claim 16, wherein:
operations related to cell searching have a higher priority level than operations related to at least one of a time or frequency tracking loop.

20. The processing system of claim 16, wherein:
operations related to at least one of a time or frequency tracking loop have a higher priority level than operations related to cell measurement.

21. An apparatus for wireless communication by a user equipment (UE), comprising:
means for monitoring occurrences of a first number of operations to be performed for a plurality of component carriers (CCs) according to different periodicities;
means for determining a second number of available narrow band (NB) radio frequency (RF) chains; and
means for scheduling, on the available NB RF chains, up to the second number of the operations to be performed for the plurality of CCs based on a scheduling algorithm if the first number is greater than the second number.

22. The apparatus of claim 21, wherein the operations comprise one or more of: cell searching, cell measurement, operations related to a time tracking loop, operations related to a frequency tracking loop, or radio link monitoring (RLM).

23. The apparatus of claim 21, wherein the means for scheduling comprises means for independently deciding, for each NB RF chain of the available NB RF chains, which operation to perform on which CC.

24. The apparatus of claim 21, wherein means for monitoring the occurrences of the first number of operations comprises:
means for maintaining timers for at least some of the first number of operations.

25. The apparatus of claim 24, further comprising means for determining priority levels of operations for which multiple timers have expired, wherein:
the scheduling algorithm takes into account the priority levels;
the scheduling algorithm schedules operations with higher priority levels before operations with lower priority levels;
operations to be performed on a primary component carrier (PCC) have a higher priority level than operations to be performed on a secondary component carrier (SCC);
operations to be performed on an activated secondary component carrier (SCC) have a higher priority level than operations to be performed on a de-activated SCC;
operations related to cell searching have a higher priority level than operations related to at least one of a time or frequency tracking loop; and
operations related to at least one of a time or frequency tracking loop have a higher priority level than operations related to cell measurement.

26. A non-transitory computer-readable medium for wireless communication by a user equipment (UE), comprising computer-executable instructions that, when executed by one or more processors of a processing system, cause the processing system to:
monitor occurrences of a first number of operations to be performed for a plurality of component carriers (CCs) according to different periodicities;
determine a second number of available narrow band (NB) radio frequency (RF) chains; and
schedule, on the available NB RF chains, up to the second number of the operations to be performed for the plurality of CCs based on a scheduling algorithm if the first number is greater than the second number.

27. The non-transitory computer-readable medium of claim 26, wherein the operations comprise one or more of: cell searching, cell measurement, operations related to a time tracking loop, operations related to a frequency tracking loop, or radio link monitoring (RLM).

28. The non-transitory computer-readable medium of claim 26, wherein the computer-executable instructions that, when executed by the one or more processors of the processing system, cause the processing system to schedule up to the second number of operations further cause the processing system to independently decide, for each NB RF chain of the available NB RF chains, which operation to perform on which CC.

29. The non-transitory computer-readable medium of claim 26, wherein the computer-executable instructions that, when executed by the one or more processors of the processing system, cause the processing system to monitor the occurrences of the first number of operations further cause the processing system to maintain timers for at least some of the first number of operations.

30. The non-transitory computer-readable medium of claim 29, wherein:
the computer-executable instructions, when executed by the one or more processors of the processing system, cause the processing system to determine priority levels of operations for which multiple timers have expired;
the scheduling algorithm takes into account the priority levels;

the scheduling algorithm schedules operations with higher priority levels before operations with lower priority levels;

operations to be performed on a primary component carrier (PCC) have a higher priority level than operations to be performed on a secondary component carrier (SCC);

operations to be performed on an activated secondary component carrier (SCC) have a higher priority level than operations to be performed on a de-activated SCC;

operations related to cell searching have a higher priority level than operations related to at least one of a time or frequency tracking loop; and operations related to at least one of a time or frequency tracking loop have a higher priority level than operations related to cell measurement.

\* \* \* \* \*